United States Patent [19]

Sybert et al.

[11] Patent Number: 5,015,698

[45] Date of Patent: May 14, 1991

[54] POLYPHENYLENE ETHER-POLYESTER COPOLYMERS, PRECURSORS THEREFOR, COMPOSITIONS CONTAINING SAID COPOLYMERS, AND METHODS FOR THEIR PREPARATION

[75] Inventors: Paul D. Sybert, Cohoes; Choong Y. Han, Schenectady; Sterling B. Brown, Schenectady; Dennis J. McFay, Schenectady; William L. Gately, Burnt Hills, all of N.Y.; John A. Tyrell, Mt. Vernon, Ind.; Robert A. Florence, Pittsfield, Mass.

[73] Assignee: General Electric Company, Schenectady, N.Y.

[21] Appl. No.: 122,480

[22] Filed: Nov. 10, 1987

Related U.S. Application Data

[63] Continuation of Ser. No. 866,661, May 27, 1986, abandoned.

[51] Int. Cl.$^5$ .................... C08L 67/02; C08L 71/04; C08G 81/00
[52] U.S. Cl. .................................. 525/391; 525/395; 525/396; 525/397; 525/437; 525/534; 525/905
[58] Field of Search ............... 525/397, 396, 390, 395, 525/391, 534, 437, 905, 392, 440; 528/183, 184, 195

[56] References Cited

U.S. PATENT DOCUMENTS

| | | |
|---|---|---|
| 3,703,564 | 11/1972 | White . |
| 3,941,751 | 3/1976 | Breslow . |
| 4,356,285 | 10/1982 | Kumagai . |
| 4,460,743 | 7/1984 | Abe et al. . |
| 4,579,905 | 4/1986 | Krabbenhoft . |
| 4,614,773 | 9/1986 | Sugio et al. . |
| 4,681,915 | 7/1987 | Bates et al. . |

FOREIGN PATENT DOCUMENTS

| | | |
|---|---|---|
| 0149921 | 12/1984 | European Pat. Off. . |
| 0148774 | 1/1985 | European Pat. Off. . |
| 3402791 | 1/1984 | Fed. Rep. of Germany . |
| 59-15984 | 7/1984 | Japan . |

OTHER PUBLICATIONS

Allport, D. C. et al., *Block Copolymers*, Applied Science Pub. (1973), p. 276.

*Primary Examiner*—Patricia Short
*Attorney, Agent, or Firm*—William H. Pittman; James C. Davis, Jr.

[57] ABSTRACT

Compositions containing polyphenylene ether-poly(alkylene dicarboxylate) copolymers are prepared by a reaction between the two polymers and, optionally, at least one functionalizing agent therefor. The functionalizing agent may first be reacted with the polyphenylene ether and the resulting functionalized polyphenylene ether in turn reacted with a functionalized or unfunctionalized poly(alkylene dicarboxylate). Alternatively, an unfunctionalized or hydroxyalkyl-functionalized polyphenylene ether may be incorporated in a conventional polyester-forming reaction. The copolymer-containing compositions are characterized by a number of desirable properties including high impact strength and solvent resistance.

13 Claims, No Drawings

POLYPHENYLENE ETHER-POLYESTER COPOLYMERS, PRECURSORS THEREFOR, COMPOSITIONS CONTAINING SAID COPOLYMERS, AND METHODS FOR THEIR PREPARATION

This application is a continuation of application Ser. No. 866,661, filed May 27, 1986, now abandoned.

This invention relates to novel resinous compositions with high impact resistance and solvent resistance, and precursors therefor. More particularly, it relates to improved compositions comprising polyphenylene ethers and poly(alkylene dicarboxylates).

The polyphenylene ethers are a widely used class of thermoplastic engineering resins characterized by excellent hydrolytic stability, dimensional stability and dielectric properties. They are also resistant to high temperature conditions under many circumstances. Because of the brittleness of many compositions containing polyphenylene ethers, they are frequently blended with impact modifiers such as elastomers to form molding compositions.

A disadvantage of the polyphenylene ethers which militates against their use for molding such items as automotive parts is their low resistance to non-polar solvents such as gasoline. For increased solvent resistance, it would be desirable to blend the polyphenylene ethers with resins which have a high degree of crystallinity and therefore are highly resistant to solvents. Illustrative of such resins are the poly(alkylene dicarboxylates), especially the poly(alkylene terephthalates). However, such blends frequently undergo phase separation and delamination. They typically contain large, incompletely dispersed polyphenylene ether particles and no phase interaction between the two resin phases. Molded parts made from such blends are typically characterized by extremely low impact strength.

A principal object of the present invention, therefore, is to provide polymer compositions having a high degree of impact strength and solvent resistance, and intermediates therefor.

A further object is to provide highly compatible polymer compositions containing polyphenylene ethers and poly(alkylene dicarboxylates), with beneficial properties of both.

A further object is to provide resinous molding compositions suitable for use in the fabrication of automotive parts and the like.

A still further object is to provide methods for preparing and treating these compositions.

Other objects will in part be obvious and will in part appear hereinafter.

The present invention is based on the discovery that it is possible to prepare compositions comprising polyphenylene ether-poly(alkylene dicarboxylate) copolymers in which the polyphenylene ether-polyester linkages include a wide variety of linking groups. As a general rule, these compositions have excellent tensile and impact properties and solvent resistance.

Accordingly, one aspect of the present invention is compositions comprising copolymers having the formula $$A-Z^1-B \qquad (I)$$

wherein A is a polyphenylene ether moiety, B is a poly(alkylene dicarboxylate) moiety containing at least 30 alkylene dicarboxylate units, and $Z^1$ is a linking group.

It is evident that the A and B moieties in formula I are derived from polyphenylene ethers and poly(alkylene dicarboxylates), respectively. These two polymers will hereinafter sometimes be referred to as "reagent A" and "reagent B", respectively.

The polyphenylene ethers (also known as polyphenylene oxides) used as reagent A are a well known class of polymers. They are widely used in industry, especially as engineering plastics in applications requiring toughness and heat resistance. Since their discovery, they have given rise to numerous variations and modifications all of which are applicable to the present invention, including but not limited to those described hereinafter.

The polyphenylene ethers comprise a plurality of structural units having the formula

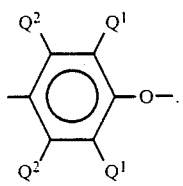

In each of said units independently, each $Q^1$ is independently halogen, primary or secondary lower alkyl (i.e., alkyl containing up to 7 carbon atoms), phenyl, haloalkyl, aminoalkyl, hydrocarbonoxy, or halohydrocarbonoxy wherein at least two carbon atoms separate the halogen and oxygen atoms; and each $Q^2$ is independently hydrogen, halogen, primary or secondary lower alkyl, phenyl, haloalkyl, hydrocarbonoxy or halohydrocarbonoxy as defined for $Q^1$. Examples of suitable primary lower alkyl groups are methyl, ethyl, n-propyl, n-butyl, isobutyl, n-amyl, isoamyl, 2-methylbutyl, n-hexyl, 2,3-dimethylbutyl, 2-, 3- or 4-methylpentyl and the corresponding heptyl groups. Examples of secondary lower alkyl groups are isopropyl, sec-butyl and 3-pentyl. Preferably, any alkyl radicals are straight chain rather than branched. Most often, each $Q^1$ is alkyl or phenyl, especially $C_{1-4}$ alkyl, and each $Q^2$ is hydrogen. Suitable polyphenylene ethers are disclosed in a large number of patents.

Both homopolymer and copolymer polyphenylene ethers are included. Suitable homopolymers are those containing, for example, 2,6-dimethyl-1,4-phenylene ether units. Suitable copolymers include random copolymers containing such units in combination with (for example) 2,3,6-trimethyl-1,4-phenylene ether units. Many suitable random copolymers, as well as homopolymers, are disclosed in the patent literature.

Also included are polyphenylene ethers containing moieties which modify properties such as molecular weight, melt viscosity and/or impact strength. Such polymers are described in the patent literature and may be prepared by grafting onto the polyphenylene ether in known manner such vinyl monomers as acrylonitrile and vinylaromatic compounds (e.g., styrene), or such polymers as polystyrenes and elastomers. The product typically contains both grafted and ungrafted moieties. Other suitable polymers are the coupled polyphenylene ethers in which the coupling agent is reacted in known manner with the hydroxy groups of two polyphenylene ether chains to produce a higher molecular weight polymer containing the reaction product of the hydroxy groups and the coupling agent. Illustrative coupling agents are low molecular weight polycarbonates, quinones, heterocycles and formals.

The polyphenylene ether generally has a number average molecular weight within the range of about 3,000–40,000 and a weight average molecular weight within the range of about 20,000–60,000, as determined by gel permeation chromatography. Its intrinsic viscosity is most often in the range of about 0.35–0.6 dl./g., as measured in chloroform at 25° C.

The polyphenylene ethers are typically prepared by the oxidative coupling of at least one corresponding monohydroxyaromatic compound. Particularly useful and readily available monohydroxyaromatic compounds are 2,6-xylenol (wherein each $Q^1$ is methyl and each $Q^2$ is hydrogen), whereupon the polymer may be characterized as a poly(2,6-dimethyl-1,4-phenylene ether), and 2,3,6-trimethylphenol (wherein each $Q^1$ and one $Q^2$ is methyl and the other $Q^2$ is hydrogen).

A variety of catalyst systems are known for the preparation of polyphenylene ethers by oxidative coupling. There is no particular limitation as to catalyst choice and any of the known catalysts can be used. For the most part, they contain at least one heavy metal compound such as a copper, manganese or cobalt compound, usually in combination with various other materials.

A first class of preferred catalyst systems consists of those containing a copper compound. Such catalysts are disclosed, for example, in U.S. Pat. Nos. 3,306,874, 3,306,875, 3,914,266 and 4,028,341. They are usually combinations of cuprous or cupric ions, halide (i.e., chloride, bromide or iodide) ions and at least one amine.

Catalyst systems containing manganese compounds constitute a second preferred class. They are generally alkaline systems in which divalent manganese is combined with such anions as halide, alkoxide or phenoxide. Most often, the manganese is present as a complex with one or more complexing and/or chelating agents such as dialkylamines, alkanolamines, alkylenediamines, o-hydroxyaromatic aldehydes, o-hydroxyazo compounds and ω-hydroxyoximes.

Among the polyphenylene ethers which are useful for the purposes of this invention are those which comprise molecules having at least one of the end groups of the formulas

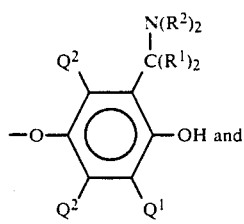
(III)

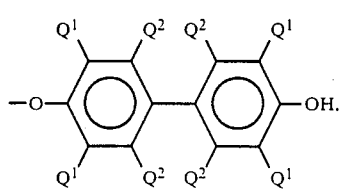
(IV)

wherein $Q^1$ and $Q^2$ are as previously defined; each $R^1$ is independently hydrogen or alkyl, with the proviso that the total number of carbon atoms in both $R^1$ radicals is 6 or less; and each $R^2$ is independently hydrogen or a $C_{1-6}$ primary alkyl radical. Preferably, each $R^1$ is hydrogen and each $R^2$ is alkyl, especially methyl or n-butyl.

Polymers containing the aminoalkyl-substituted end groups of formula III may be obtained by incorporating an appropriate primary or secondary monoamine as one of the constituents of the oxidative coupling reaction mixture, especially when a copper- or manganese-containing catalyst is used. Such amines, especially the dialkylamines and preferably di-n-butylamine and dimethylamine, frequently become chemically bound to the polyphenylene ether, most often by replacing one of the α-hydrogen atoms on one or more $Q^1$ radicals. The principal site of reaction is the $Q^1$ radical adjacent to the hydroxy group on the terminal unit of the polymer chain. During further processing and/or blending, the aminoalkyl-substituted end groups may undergo various reactions, probably involving a quinone methide-type intermediate of the formula

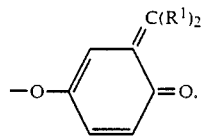
(V)

with numerous beneficial effects often including an increase in impact strength and compatibilization with other blend components. Reference is made to U.S. Pat. Nos. 4,054,553, 4,092,294, 4,477,649, 4,477,651 and 4,517,341, the disclosures of which are incorporated by reference herein.

Polymers with 4-hydroxybiphenyl end groups of formula IV are typically obtained from reaction mixtures in which a by-product diphenoquinone of the formula

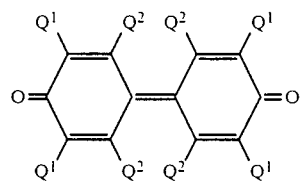
(VI)

is present, especially in a copper-halide-secondary or tertiary amine system. In this regard, the disclosures of U.S. Pat. No. 4,477,649 is again pertinent as are those of U.S. Pat. Nos. 4,234,706 and 4,482,697, which are also incorporated by reference herein. In mixtures of this type, the diphenoquinone is ultimately incorporated into the polymer in substantial proportions, largely as an end group.

In many polyphenylene ethers obtained under the above-described conditions, a substantial proportion of the polymer molecules, typically constituting as much as about 90% by weight of the polymer, contain end groups having one or frequently both of formulas III and IV. It should be understood, however, that other end groups may be present and that the invention in its broadest sense may not be dependent on the molecular structures of the polyphenylene ether end groups.

It will be apparent to those skilled in the art from the foregoing that the polyphenylene ethers contemplated for use in the present invention include all those presently known, irrespective of variations in structural units or ancillary chemical features.

The poly(alkylene dicarboxylates) useful as reagent B comprise at least 30 and most often at least 50 structural units, usually of the formula

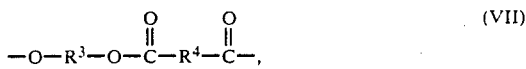

wherein $R^3$ is a divalent aliphatic or alicyclic radical containing about 2–10 carbon atoms and $R^4$ is a divalent aliphatic, alicyclic or aromatic radical containing about 2–10 and usually about 6–10 carbon atoms. They are typically prepared by the known reaction of dihydroxy compounds with dicarboxylic acids or functional derivatives thereof such as anhydrides, acid chlorides or lower alkyl (especially methyl) esters, preferably the esters.

The $R^3$ radicals may be one or more aliphatic or alicyclic hydrocarbon radicals, alicyclic radicals being known to those skilled in the art to be equivalent to aliphatic radicals for the purposes of the invention. They may be derived from such dihydroxy compounds as ethylene glycol, 1,4-butanediol (both of which are preferred), propylene glycol, 1,3-propanediol, 1,6-hexanediol, 1,10-decanediol, 1,4-cyclohexanedimethanol and 2-butene-1,4-diol. They may also be radicals containing substituents which do not substantially alter the reactivity of the dihydroxy compound (e.g., alkoxy, halo, nitrile) or hetero atoms (e.g., oxygen or sulfur). The $R^3$ radicals are usually saturated.

The $R^4$ radicals may be derived from such acids as succinic, adipic, maleic, isophthalic and terephthalic acids or similar substituted and hetero atom-containing acids.

Most often, $R^3$ and $R^4$ are hydrocarbon radicals, typically containing about 2–10 carbon atoms. Preferably, $R^3$ is aliphatic and $R^4$ is aromatic. The polyester is most desirably a poly(alkylene terephthalate), particularly poly(ethylene terephthalate) or poly(1,4-butylene terephthalate) (hereinafter sometimes simply "polyethylene terephthalate" and "polybutylene terephthalate", respectively) and especially the latter. Such polyesters are known in the art as illustrated by the following patents:

| | |
|---|---|
| 2,465,319 | 3,047,539 |
| 2,720,502 | 3,671,487 |
| 2,727,881 | 3,953,394 |
| 2,822,348 | 4,128,526 |

The polyesters most often have number average molecular weights in the range of about 10,000–70,000, as determined by intrinsic viscosity (IV) at 30° C. in a mixture of 60% (by weight) phenol and 40% 1,1,2,2-tetrachloroethane.

It is also contemplated to employ elastomeric polyesters as reagent B. Such polyesters are known in the art; they are exemplified by compositions in which a portion of the $R^3$ values are soft segment radicals such as polyoxyalkylene (typically polyoxyethylene or polyoxytetramethylene) and units derived from lactones such as ε-caprolactone. Numerous elastomeric polyesters of this type are commercially available; they include those sold by DuPont under the trademark HYTREL and by General Electric under the trademark LOMOD.

The $Z^1$ value is a linking group which is usually divalent (as shown in formula I) but may also be trivalent, tetravalent, etc., whereupon the composition will have multiple polyphenylene ether or polyester moieties. Its exact molecular structure is not critical from the standpoint of this invention, since many linking groups are effective to form the desired copolymers. However, it most often has a molecular or formula weight up to about 1500 and preferably up to about 750. Moreover, the fact that only one $Z^1$ value is shown in formula I does not exclude from the invention compositions in which at least one polyphenylene ether or polyester moiety contains a plurality of $Z^1$ radicals and associated structure.

Illustrative $Z^1$ values are single bonds and linkages containing one or more polyvalent (usually divalent) ether, ester, amide, imide or urethane groups. Also present therein may be one or more polyvalent (usually divalent) aliphatic, alicyclic, heterocyclic or aromatic radicals, including hydrocarbon radicals and substituted hydrocarbon radicals wherein the substituents do not undergo interfering reactions in the context of the invention. Such linkages may be formed by the reaction of a hydroxy- or carboxy-terminated polyester, a polyphenylene ether and optionally at least one functionalizing agent in which the functionality is, for example, one or more epoxide, isocyanate (including masked isocyanate groups such as cyclic urea), cyanurate, isocyanurate, carbodiimide, oxazoline, ester, urethane, carboxylate, carboxy anhydride, carboxamide or carboximide groups.

The copolymer compositions of this invention may be prepared by reactions of polyphenylene ethers with poly(alkylene dicarboxylates). Numerous methods exist for conducting such reactions.

Many of these methods are of particular interest when a functionalized polyphenylene ether is employed. These may be prepared by the reaction of at least one functionalizing agent with a polyphenylene ether. The functionality of the functionalized polyphenylene ether may be present on the end group; for example, as a result of reaction with the phenolic terminal hydroxy group. The hydroxy group in an end group having formula IV is preferred because of its relative thermal stability. Functionalization may also involve one of the aromatic rings in the polymer chain, or an alkyl group attached thereto.

One method of functionalizing the polyphenylene ether is by reaction with at least one compound containing (a) a carbon-carbon double or triple bond, hydroxy group, alkoxy group, aryloxy group or acyl halide group, and also (b) a carboxylic acid, acid salt, acid anhydride, acid amide, acid ester or imido group. A wide variety of such compounds are suitable for use in the invention. Many illustrative compounds are listed in U.S. Pat. No. 4,315,086, the disclosure of which is incorporated by reference herein. They include maleic, fumaric, itaconic and citraconic acids and their derivatives, various unsaturated fatty oils and the acids derived therefrom, relatively low molecular weight olefinic acids such as acrylic acid and its homologs, and the like.

Other functionalizing agents of this type are the aliphatic polycarboxylic acids and derivatives thereof disclosed in copending, commonly owned application Ser. No. 736,489, filed May 20, 1985. These compounds may be represented by the formula

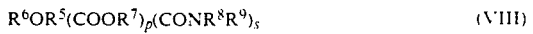

wherein $R^5$ is a linear or branched chain saturated aliphatic hydrocarbon of from 2 to 20, preferably 2 to 10, carbon atoms; $R^6$ is hydrogen or an alkyl or aryl group of 1 to 10, preferably 1 to 6, most preferably 1 to 4, carbon atoms, especially hydrogen; each $R^7$ is independently hydrogen or an alkyl or aryl group of from 1 to 20 carbon atoms, preferably from 1 to 10 carbon atoms; each $R^8$ and $R^9$ is independently hydrogen or an alkyl or aryl group of from 1 to 10, preferably from 1 to 6, most preferably 1 to 4, carbon atoms; p and s are each greater than or equal to zero and p+s is at least 2, preferably 2 or 3; and wherein $OR^6$ is alpha or beta to a carbonyl group and at least two carbonyl groups are separated by 2 to 6 carbon atoms.

Illustrative of suitable polycarboxylic acids of this type are citric acid, malic acid, and agaricic acid. Their esters, amides and salts may also be used.

Still another class of these functionalizing agents is disclosed in copending, commonly owned application Ser. No. 780,151, filed Sept. 26, 1985, the disclosure of which is also incorporated by reference herein. Illustrative compounds within this class are represented by the formula

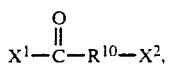 (IX)

wherein $R^{10}$ is an aromatic or saturated aliphatic radical, $X^1$ is halogen (especially chlorine) and $X^2$ is one or two carboxylic acid, acid salt, acid amide or acid ester groups or a dicarboxylic acid anhydride or imide group. Illustrative compounds of this type are carboxymethylsuccinic anhydride acid chloride and trimellitic anhydride acid chloride (TAAC).

Particularly preferred functionalizing agents from this class are maleic acid and its derivatives (especially maleic anhydride), fumaric acid and trimellitic anhydride acid chloride.

These functionalizing agents may be reacted with the polyphenylene ether by heating a mixture thereof, typically at a temperature within the range of about 80°–390° C., in solution or in the melt and preferably the latter. In general, about 0.01–2.0, most often about 0.3–1.0 and preferably about 0.5–1.0 parts (by weight) of said functionalizing agent is employed per 100 parts of polyphenylene ether. The reaction may conveniently be carried out in an extruder or similar equipment. Certain aspects of the chemistry of polyphenylene ethers so functionalized are disclosed and claimed in copending, commonly owned application Ser. No. 885,497, filed July 14, 1986.

In addition to the above-described functionalizing agents, other compounds may be used singly or, when appropriate, in combination, for this purpose. Illustrative functionalizing compounds include the following in addition to those described hereinabove: terephthaloyl chloride, isophthaloyl chloride, phthalic anhydride, succinic anhydride, 1,1'-terephthaloylbisimidazole, 1,1'-isophthaloylbisimidazole,. di-3-benzisoxazolyl terephthalate, epichlorohydrin, eppxy novolaks, hexamethylene diisocyanate, azelaoylbis(propyleneurea), toluene diisocyanate, tris(6-isocyanatohexyl) isocyanurate, bis(4-isocyanatophenyl)methane, 2,4-bis(4-isocyanatophenylmethyl)phenyl isocyanate, 1,2-epoxy-7-octene, glycidyl methacrylate, glycidyl acrylate, glycidyl ethyl maleate, glycidyl ethyl fumarate, allyl glycidyl ether, diphenylmethane 4,4'-bis(cyclohexylcarbodiimide), 1-(t-butylcarbodiimido)-2,4-bis(4-t-butylcarbodiimido- phenylmethyl)benzene, di-n-butyl maleate, 1,4-phenylene-bis(2-oxazoline), 1,4-butane-bis-(N-isatoic anhydride), terephthaloyl chloride in combination with diols such as 1,4-butanediol and 1,6-hexanediol or with epoxy alcohols such as glycidol, and maleic anhydride in combination with hydroxy amines such as ethanolamine or diamines such as ethylenediamine.

Many of the functionalized polyphenylene ethers prepared by reaction with the compounds listed above, and similar compounds, are disclosed and claimed in the following copending, commonly owned applications:

Ser. No. 866,645, filed May 27, 1986, now U.S. Pat. No. 689,372;
Ser. No. 885,112, filed July 14, 1986;
Ser. No. 901,858, filed Aug. 29, 1986;
Ser. No. 912,705, filed Sept. 29, 1986.

The reaction conditions may be chosen so as to promote reactions involving the hydroxy end group of the polyphenylene ether, or reactions involving other portions of the polymer molecule, especially the polymer chain and/or alkyl substituents thereon. The latter may be electrophilic substitution reactions involving, for example, N-hydroxyalkyl amides in combination with Lewis acids, or free radical reactions with ethylenically unsaturated epoxides.

The free radical reaction may be conducted in solution or in the melt, typically at temperatures in the range of about 100°–350° C. Suitable free radical initiators include benzoyl peroxide, cumyl peroxide and azobisisobutyronitrile; other conventional initiators known in the art may also be used, in conventional amounts (typically about 2–15% by weight based on polyphenylene ether).

The above-listed ethylenically unsaturated epoxides are among those which undergo this reaction. The proportion of epoxide used with respect to polyphenylene ether is not critical and depends on the amount of functionalization desired. It is usually about 10–120% by weight.

It is believed that the functionalization reaction may involve abstraction of a hydrogen atom from an alkyl group on the polyphenylene ether chain to generate a free radical, which reacts with one or more olefinic moieties in the epoxide to form a monofunctional or polyfunctional side chain. However, this aspect of the invention is in no way dependent on theory.

It is frequently found that some homopolymerization of the epoxide occurs simultaneously with functionalization of the polyphenylene ether. Since the presence of homopolymer is not beneficial for the purposes of the invention, removal thereof is advisable. It may be achieved by conventional means, typically involving precipitation of a methylene chloride complex of the polyphenylene ether as described by Factor et al. in *J. Polymer Sci., Polymer Letters Ed.*, 7, 205–209 (1969).

The only important consideration is to provide a reactive site on a polyphenylene ether for copolymer formation with the polyester. The conditions of the reaction providing that site are not a critical aspect of the invention, but may be conventional based on the type of reaction involved.

The preparation of functionalized polyphenylene ethers is illustrated by the following examples. The polyphenylene ether used in each example herein, unless otherwise indicated, was an unfunctionalized poly-(2,6-dimethyl-1,4-phenylene ether) having a number average molecular weight of about 20,000, an intrinsic viscosity (IV) in chloroform at 25° C. of 0.48 dl./g and 0.084% (by weight) hydroxy groups.

EXAMPLE 1

To a solution of 325 grams of polyphenylene ether in 3 liters of toluene was added a solution of 16.53 grams (81.4 mmol.) of terephthaloyl chloride in 250 ml. of toluene. The mixture was stirred for 16 hours, after which 16.7 grams (165 mmol.) of triethylamine was added. Stirring was continued for 4 hours, after which 15.3 grams (207 mmol.) of glycidol was added and stirring was continued for 3 days. The product was precipitated by addition of methanol, redissolved in toluene and reprecipitated, and dried under reduced pressure. It was shown by infrared spectroscopy to be the desired epoxide-functionalized polyphenylene ether, and by analysis to contain 0.0014% (by weight) hydroxy groups.

EXAMPLE 2

Methanesulfonic acid, 617.2 grams (6.43 moles), was added slowly at room temperature, with stirring, to a solution of 500 grams of polyphenylene ether in 3.33 liters of chloroform. There was then added over 15 minutes, with stirring, a solution of 11.67 grams (131 mmol.) of N-methylolacetamide in 150 ml. of nitromethane. Stirring was continued for 30 minutes, after which the polymer was precipitated by pouring the solution into methanol. The precipitate was washed with water until the washings were neutral, redissolved in chloroform, reprecipitated into methanol, filtered and dried in an oven to yield the desired amide-functionalized polyphenylene ether.

EXAMPLE 3

A solution of 100 parts of polyphenylene ether, 2 parts of TAAC and 5 parts of dimethyl-n-butylamine in 500 parts of toluene was heated at 95° C. for 3 hours, with stirring. Upon precipitation as in Example 1, the desired anhydride-functionalized polyphenylene ether was obtained. Its structure was confirmed by infrared spectroscopy.

EXAMPLE 4

Cyclohexylamine, 8.64 grams (87 mmol.), was added dropwise under nitrogen, with stirring, to a solution of 10 grams (26.2 mmol.) of 1-isocyanato-2,4-bis(4-isocyanatophenylmethyl)benzene in 200 ml. of dry toluene. The mixture was heated for 1 hour at 80° C., with stirring, and cooled to room temperature. The precipitated solid was filtered, washed with toluene and dried. Based on method of preparation, it was a tris-urea of the formula

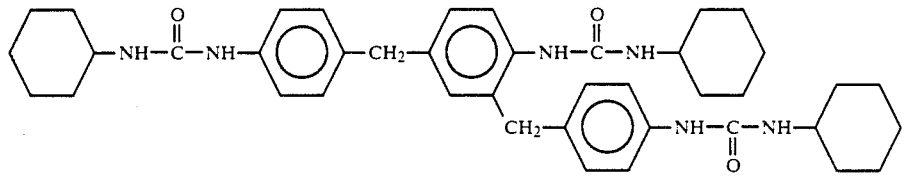

To a mixture of 4 grams of the tris-urea in 12 ml. of dry pyridine was added portionwise 6 grams of p-toluenesulfonyl chloride. The mixture was heated under nitrogen at 70° C. for 1 hour and poured into 30 ml. of ice water, with vigorous stirring. Ethyl acetate, 40 ml., was added and the mixture was stirred for 10 minutes. The aqueous layer was removed and the organic layer was washed with aqueous sodium carbonate solution and vacuum stripped. The residue was extracted twice with petroleum ether to yield the desired 1-cyclohexylcarbodiimido-2,4-bis(4-cyclohexylcarbodiimidophenylmethyl)benzene.

To a solution of 500 grams of the anhydride-functionalized polyphenylene ether of Example 3 in 3.2 liters of dry toluene was added under nitrogen, with stirring, a solution of 58 grams of the tris-carbodiimide prepared as described above. The mixture was heated under reflux for 4 hours in a nitrogen atmosphere, cooled and poured into a large excess of acetone. The desired carbodiimide-functionalized polyphenylene ether was filtered, washed with acetone and dried.

EXAMPLES 5-8

Various monomeric epoxides, in combination with dicumyl peroxide (4.3% by weight based on polyphenylene ether in Examples 5-7, 6% in Example 8) as a free radical initiator, were added to 10% (weight/volume) solutions of polyphenylene ether in chlorobenzene. The solutions were heated to reflux for 3 hours under nitrogen, with stirring, and the crude epoxide-functionalized polymers were cooled and precipitated with methanol. They were purified by dissolving at a level of about 10% by weight in methylene chloride, allowing the solution to stand until the methylene chloride complex had precipitated, filtering, washing with methylene chloride and drying in an oven. The relevant parameters are given in Table I.

TABLE I

| | Monomer | |
|---|---|---|
| Example | Identity | Amt.(ml. per g. polyphenylene ether) |
| 5 | Glycidyl methacrylate | 0.56 |
| 6 | Glycidyl acrylate | 0.17 |
| 7 | Allyl glycidyl ether | 0.5 |
| 8 | 1,2-Epoxy-7-octene | 1.0 |

EXAMPLE 9

To a solution of 12.5 grams of polyphenylene ether in 125 ml. of toluene was added under nitrogen, with stirring, 7 ml. of glycidyl methacrylate and 0.48 gram of benzoyl peroxide. The mixture was heated under reflux for 3 hours and the epoxide-functionalized polyphenylene ether was isolated as in Examples 5-8.

EXAMPLE 10

A mixture of 970 grams of polyphenylene ether and 30 grams of mixed glycidyl ethyl maleate and glycidyl ethyl fumarate was extruded on a twin-screw extruder at 290° C. The resulting epoxy-functionalized polyphenylene ether was purified by reprecipitation from toluene with methanol, formation of the methylene chloride complex and thermal decomposition thereof as in Examples 5–8.

EXAMPLE 11

A mixture of 2.2 grams of polyphenylene ether, 0.5 ml. of glycidyl methacrylate and 0.1 gram of benzoyl peroxide was heated at 320°–330° C. under nitrogen for 5 minutes, with gentle stirring. Upon dissolution in toluene, reprecipitation with methanol, washing with methylene chloride and drying, there was obtained the desired epoxide-functionalized polyphenylene ether.

EXAMPLE 12

A mixture of 99 parts of polyphenylene ether and 1 part of maleic anhydride was extruded on a single-screw extruder at temperatures in the range of 120°–330° C. The extrudate, comprising an anhydride-functionalized polyphenylene ether, was quenched in water, pelletized, dissolved in chloroform, precipitated with methanol, filtered and vacuum dried at 60° C.

EXAMPLES 13–16

Blends of polyphenylene ether with maleic anhydride or dibutyl maleate were prepared in a Henschel mixer and extruded on a twin-screw extruder. The extrudates, constituting the desired anhydride- and ester-functionalized polyphenylene ethers, were quenched in a water bath and pelletized. The details are given in Table II, all parts being by weight.

TABLE II

| | Reagent | | |
|---|---|---|---|
| Example | Identity | Amt. (parts per 100 parts polyphenylene ether) | Extrusion temp., °C. |
| 13 | Maleic anhydride | 0.5 | 330* |
| 14 | Dibutyl maleate | 1 | 330* |
| 15 | " | 2 | 310 |
| 16 | " | 5 | 310 |

*Temperature of extruder walls.

EXAMPLES 17–21

Hydroxyalkyl-functionalized polyphenylene ethers were prepared by the reaction of various poly(2,6-dimethyl-1,4-phenylene)ethers with terephthaloyl chloride and 1,4-butanediol or 1,6-hexanediol, according to the following procedure.

A solution of the polyphenylene ether in toluene was distilled to remove about 75 ml. of toluene and any water or other volatiles. The solution was cooled to 70° C. and terephthaloyl chloride was added, after which the solution was stirred at the same temperature for 2 hours. Triethylamine was added and the mixture was stirred overnight. A solution of the diol in 150 ml. of chloroform was then added and stirring was continued at 70° C. for 4 hours. The hydroxyalkyl-functionalized polyphenylene ether was precipitated with methanol, dissolved in chloroform, reprecipitated with methanol and dried under vacuum at 60° C.

The compositional details and other parameters are given in Table III.

TABLE III

| | Polyphenylene ether | | Toluene, l. | Terephthaloyl chloride, g. | Triethylamine, g. | Diol | | Product | |
|---|---|---|---|---|---|---|---|---|---|
| Example | IV, dl./g. | Amt., g. | | | | No. of carbons | Amt., g. | IV | % OH by Wt. |
| 17 | 0.51 | 325 | 3.0 | 16.9 | 18.6 | 4 | 40 | 0.54 | 0.053 |
| 18 | 0.51 | 456 | 3.75 | 23.8 | 25.0 | 4 | 58 | — | — |
| 19 | 0.51 | 456 | 3.75 | 32.8 | 34.2 | 4 | 78 | 0.48 | 0.039 |
| 20 | 0.43 | 440 | 3.75 | 31.6 | 31.5 | 6 | 99 | | 0.038 |
| 21 | 0.43 | 469 | 3.75 | 24.4 | 25.4 | 6 | 75 | 0.50 | 0.035 |

EXAMPLE 22

Ethanolamine, 0.2 ml., was added to a solution of 19.41 grams of the anhydride-functionalized polyphenylene ether of Example 13 in 100 ml. of o-dichlorobenzene. The solution was heated at 170° under nitrogen overnight, with stirring. The N-hydroxyalkylimide-functionalized polyphenylene ether was precipitated with methanol, reprecipitated three times from chloroform with methanol and dried under vacuum.

EXAMPLE 23

Ethylenediamine, 3 ml., was added to a solution of 10 grams of the anhydride-functionalized polyphenylene ether of Example 13 in 100 ml. of toluene, while said solution was maintained at reflux under nitrogen. Refluxing was continued for 6 hours, after which the N-aminoalkylimide-functionalized polyphenylene ether was precipitated by addition of methanol, reprecipitated from chloroform with methanol, and dried at 60° in vacuum.

EXAMPLES 24–25

Examples 24–26 describe the preparation of bis(hydroxyalkyl) maleates and fumarates used in the preparation of hydroxyalkyl-functionalized polyphenylene ethers.

Titanium(IV) isopropoxide was added at 165° C. to a mixture of dimethyl maleate and 1,4-butanediol. Heating at this temperature was continued to complete esterification, with removal of by-product methanol by distillation. When methanol removal was complete, any excess diol was removed by vacuum stripping to yield the desired bis(hydroxyalkyl) maleates. The details of their preparation are given in Table IV.

TABLE IV

| | Dimethyl maleate, moles | Diol | | $Ti(OC_3H_7)_4$, ml. |
|---|---|---|---|---|
| Example | | No. of carbons | Amt., moles | |
| 24 | 0.368 | 4 | 2.18 | 0.2 |
| 25 | 1.96 | 4 | 3.55 | 0.15 |

EXAMPLE 26

A solution of 0.1 mole of fumaryl chloride in 40 ml. of methylene chloride was added dropwise at 5°–10° C. over 2 hours under nitrogen, with stirring, to a suspension of 0.8 mole of 1,6-hexanediol in 1 liter of methylene chloride. There was simultaneously added a solution of 0.21 mole of sodium hydroxide in 50 ml. of water. The mixture was stirred and allowed to warm to room temperature and the organic layer was separated, filtered through magnesium sulfate and vacuum stripped. Unreacted 1,6-hexanediol was removed by vacuum distillation. The residue was the desired bis(6-hydroxyhexyl) fumarate.

EXAMPLES 27-34

Polyphenylene ethers were dry blended with the above bis(hydroxyalkyl) maleates and the blends were extruded in a twin-screw extruder, with vacuum venting. The extrudates, constituting the desired hydroxyalkyl-functionalized polyphenylene ethers, were quenched in water and pelletized. The details of functionalization are given in Table V.

TABLE V

| Example | Maleate of Example | Polyphenylene ether IV, dl./g. | Parts maleate per 100 parts polyphenylene ether | Extruder temp., °C. |
|---|---|---|---|---|
| 27 | 24 | 0.5 | 1 | 275 |
| 28 | 24 | 0.5 | 2 | 275 |
| 29 | 24 | 0.5 | 5 | 275 |
| 30 | 25 | 0.4 | 2 | 285 |
| 31 | 25 | 0.5 | 2 | 290 |
| 32 | 26 | 0.5 | 2.5 | 293 |
| 33 | 26 | 0.5 | 1 | 293 |
| 34 | 26 | 0.5 | 5 | 293 |

The copolymers of this invention may be prepared by a number of methods. These include reactions of unfunctionalized or (preferably) hydroxyalkyl-functionalized (including N-hydroxyalkylimide-functionalized) polyphenylene ethers with preformed polyesters containing carboxy end groups, or with one or more precursors of such polyesters, to produce copolymers in which $Z^1$ is a single bond or contains at least one ester group. Conversely, a hydroxy-terminated polyester may be reacted with a carboxy-functionalized (e.g., by reaction with maleic anhydride, fumaric acid or TAAC) polyphenylene ether. These reactions are straightforward and are conducted under conventional esterification conditions.

Reactions involving polyester precursors are often particularly useful when the reaction of a functionalized or unfunctionalized polyphenylene ether with a polyester would produce a copolymer with an undesirably low molecular weight of the polyester portion. This sometimes occurs because of molecular weight degradation of the polyester upon reaction with the polyphenylene ether.

In one polyester precursor method, a polyphenylene ether, preferably hydroxyalkyl-functionalized, is incorporated in a conventional polyester-forming reaction. As previously noted, such reactions ordinarily involve dihydroxy compounds and dicarboxylic acids or functional derivatives thereof, preferably lower alkyl and especially methyl esters.

In a second method, a polyester oligomer, generally containing up to about 25 structural units, is initially formed and subsequently reacted with a hydroxyalkyl-terminated polyphenylene ether. This process, like the first, utilizes conventional polyester-forming conditions.

It is also within the scope of the invention to react other functionalized polyphenylene ethers as described hereinabove with at least one preformed poly(alkylene dicarboxylate) to prepare copolymer compositions of this invention. This reaction may be conducted in solution or in the melt, generally at temperatures within the range of about 100°-300° and preferably about 150°-290° C. Depending on the nature of the functionalization, it may be necessary or preferred to employ at least one catalyst in the reaction; suitable catalysts will be apparent to those skilled in the art upon consideration of the functional groups to be reacted.

It is sometimes advantageous to prepare a functionalized polyester for reaction with a functionalized or unfunctionalized polyphenylene ether. Polyesters containing amine or isocyanate end groups are particularly useful; amine-functionalized polyesters are disclosed, for example, in U.S. Pat. No. 4,436,895. Therefore, another aspect of the present invention is amine- and isocyanate-terminated poly(alkylene dicarboxylates). For the most part, such polyesters comprise repeating units of formula VII and end groups of the formula

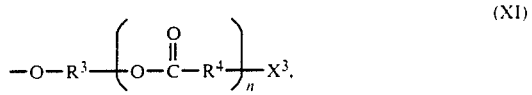
(XI)

wherein $R^3$ and $R^4$ are as previously defined, $X^3$ is $NH^2$ or

(XII)

n is 0 or 1 and $Z^3$ is a divalent aliphatic or aromatic radical.

The $Z^3$ value may be any aliphatic or aromatic radical present in a polyisocyanate, most often a diisocyanate. It is usually an alkylene or arylene radical, most often hexamethylene, tolylene or p,p'-diphenylenemethane.

The value of n will depend on whether the functionalized polyester is prepared from a hydroxy- or carboxy-terminated polymer. Hydroxy groups react with diisocyanates to produce isocyanato carbamates and with amino acids to form amino esters, and therefore n will be 0 in the case of hydroxy termination. On the other hand, carboxylic acid groups react with diisocyanates with decarboxylation to form isocyanato amides, whereupon n will be 1.

The preparation of the amine- or isocyanate-terminated polyester may be achieved by reaction of the polyester with an amino acid, amino ester or polyisocyanate (usually a diisocyanate) in the melt or in solution. Temperatures in the range of about 100°-175° C. are usually adequate. Preparation by incorporation of an amino acid or amino ester in a conventional polyester-forming reaction as an endcapping agent is also contemplated.

The preparation of the amine- or isocyanate-terminated polyesters of this invention is illustrated by the following examples. Unless otherwise indicated, the polyester used in these and other examples was a polybutylene terephthalate having a number average molecular weight of about 40,000 and a carboxy end group concentration of 24.7 microequivalents per gram.

EXAMPLE 35

A solution of 20 grams of polyester in 200 ml. of dry 1,1,2,2-tetrachloroethane was heated to 140° C. under nitrogen and 6 ml. of hexamethylene diisocyanate was added. Heating and stirring under nitrogen were continued for 3 days; the solution was then diluted with 300 ml. of dry acetone and the precipitated product was filtered, washed with acetone, reprecipitated twice more in the same way and dried under vacuum. Upon reaction of a portion of the product with n-octadecanol and spectroscopic analysis, it was found that all of the hydroxy end groups and more than 90% of the carboxy end groups had been functionalized with isocyanate.

EXAMPLE 36

Following substantially the procedure of Example 35, an isocyanate-functionalized polyester was prepared from a polybutylene terephthalate oligomer having a number average molecular weight of about 4,000.

EXAMPLE 37

A mixture of 300 grams of 1,4-butanediol, 388 grams of dimethyl terephthalate, 7.3 grams of ethyl 4-aminobenzoate and 0.5 ml. of tetra-2-ethylhexyl titanate was heated with stirring as methanol was removed by distillation. The residue after complete removal of methanol was the desired amine-functionalized polyester.

Still another method for preparing the copolymer compositions of this invention is to blend the polyphenylene ether (which may be functionalized or unfunctionalized), polyester and at least one functionalizing agent and then heat the blend, in solution or in the melt, under conditions similar to those described hereinabove for the functionalized polyphenylene ether-polyester reaction. Said functionalizing agent then reacts substantially simultaneously with both polymers, yielding the desired copolymer composition.

In general, the copolymer compositions of this invention comprise only partially copolymer, with the balance being a polyphenylene ether-polyester blend. The approximate proportion of copolymer in the composition may often be conveniently expressed as the percentage of copolymerized polyphenylene ether based on total polyester. It may be determined by extracting unreacted polyphenylene ether with a suitable solvent, typically toluene, and analyzing the insoluble residue (copolymer and residual polyester) by proton nuclear magnetic resonance.

If the functionalizing agent is one which reacts more favorably with carboxy end groups then with hydroxy end groups, it is frequently preferred to maximize the proportion of carboxy end groups in the polyester. This may frequently be accomplished by pre-extruding the polyester, typically at a temperature in the range of about 250°–300° C. Under these conditions, there is apparently a loss by degradation and volatilization of hydroxy end group functionality, producing a polymer with a high proportion of carboxy end groups.

The preparation of polyphenylene ether-polyester copolymer compositions of this invention is illustrated by the following examples.

EXAMPLE 38

A solution of 20 grams of the hydroxyalkyl-functionalized polyphenylene ether of Example 17, 32.2 grams of dimethyl terephthalate, 16.4 grams of 1,4-butanediol and 0.18 ml. of tetraisopropyl titanate in 40 ml. of 1,2,4-trichlorobenzene was heated at 170° C., with stirring, as methanol was removed by distillation. When 10 grams of methanol had been removed, the temperature was increased to 255° C. and vacuum was applied to remove trichlorobenzene and excess diol. The resulting melt was stirred at 255° C. for 1½ hours at 0.1 torr to produce the desired polyphenylene ether-polybutylene terephthalate copolymer.

EXAMPLE 39

A mixture of 79 grams of dimethyl terephthalate, 63 grams of 1,4-butanediol and 0.1 ml. of tetra-2-ethylhexyl titanate was heated at 165–235° C. as methanol was removed by distillation, and then under vacuum for ½ hour at 250°–265° C. There was then added, under nitrogen, 60 grams of the hydroxyalkyl-functionalized polyphenylene ether of Example 20. The mixture was stirred at 250°–265° C. under nitrogen for 5 minutes and under reduced pressure for 30 minutes. Upon analysis, it was shown that about 7% of the polyphenylene ether was copolymerized.

EXAMPLE 40

To a solution of 50 grams of polyphenylene ether in 700 ml. of 1,2,4-trichlorobenzene was added 985 mg. of maleic anhydride. The mixture was stirred until dissolution took place, whereupon 750 ml. of 3-amino-1-propanol was added. Stirring was continued for one hour, after which 43.6 grams each of dimethyl terephthalate and 1,4-butanediol were added. The mixture was heated to 145° C., with stirring, and 0.15 ml. of tetra-2-ethylhexyl titanate was added. Heating was continued and the temperature increased to 190° C., whereupon methanol was removed by distillation. When a major proportion of volatile materials (methanol, 1,4-butanediol and trichlorobenzene) had been removed by distillation, the mixture was vacuum stripped to yield the desired polyphenylene ether-polyester copolymer.

EXAMPLE 41

A solution of 250 grams of polyester in 3.8 liters of 1,2,4-trichlorobenzene was heated to 200° C. and 250 grams of the epoxide-functionalized polyphenylene ether of Example 1 was added under nitrogen, with stirring. Stirring at 200° C. was continued for 60 hours, after which the copolymer composition was precipitated by pouring into acetone, extracted with methanol and dried under vacuum. Analysis showed the presence of 28% copolymerized polyphenylene ether.

EXAMPLE 42

The procedure of Example 41 was repeated, using a polyester which had been preextruded on a twin-screw extruder at about 260° C., and which had a carboxylate end group concentration of 34.3 microequivalents per gram. Analysis showed the presence of 39% copolymerized polyphenylene ether.

EXAMPLE 43

A solution of 150 grams of the preextruded polyester of Example 42 in 2.25 liters of 1,2,4-trichlorobenzene was heated to 200° C. under nitrogen, and 150 grams of the carbodiimide-functionalized polyphenylene ether of Example 4 was added. Heating was continued for 2 hours at 190° C. The solution was then poured into acetone and the precipitated copolymer composition filtered and extracted with acetone. Analysis showed the presence of 61% copolymerized polyphenylene ether.

EXAMPLES 44–48

A mixture of 2 grams of the polybutylene terephthalate oligomer used as a reactant in Example 36, 2 grams of functionalized polyphenylene ether, 0.1 ml. of titanium(IV) isopropoxide and 40 ml. of 1,2,4-trichlorobenzene was heated at 200°–220° C. for 3–4 hours. Toluene, 100 ml., was added carefully and the mixture was heated under reflux for ½) hour, whereupon the copolymer composition precipitated. It was isolated by centrifugation, washed with toluene, centrifuged again and dried at 60° C. under vacuum. The products were analyzed by proton nuclear magnetic resonance to determine the amount of copolymerized polyphenylene ether. The results are given in Table VI (PPE=polyphenylene ether).

TABLE VI

| Example | Functionalized PPE of Example | % copolymerized PPE |
|---|---|---|
| 44 | 3 | 13 |
| 45 | 13 | 16 |
| 46 | 14 | 19 |
| 47 | 15 | 19 |
| 48 | 16 | 20 |

EXAMPLES 49–58

Solutions of 10 grams of functionalized polyphenylene ether and 10 grams of polyester in 200 ml. 1,2,4-trichlorobenzene were heated to 220° C. and 0.1 ml. of titanium(IV) isopropoxide was added. Heating was continued under nitrogen, with stirring, with samples being periodically removed and analyzed for copolymer formation. The results are given in Table VII.

TABLE VII

| Example | Functionalized PPE of Example | % copolymerized PPE |
|---|---|---|
| 49 | 17 | 56 |
| 50 | 21 | 26 |
| 51 | 27 | 15 |
| 52 | 28 | 31 |
| 53 | 29 | 36 |
| 54 | 30 | 21 |
| 55 | 31 | 21 |
| 56 | 32 | 30 |
| 57 | 33 | 14 |
| 58 | 34 | 46 |

EXAMPLE 59

A solution in 85 ml. of 1,2,4-trichlorobenzene of 5 grams of the anhydride-functionalized polyphenylene ether of Example 12, 5 grams of a polybutylene terephthalate having a weight average molecular weight of about 25,000 which had been preextruded at temperatures in the range of 120°–260° C., and 5 grams of an epoxy novolak commercially available from Dow Chemical Company under the designation "D.E.N. 485" was heated at 200° C., under nitrogen, for 16 hours. Toluene, 100 ml., was added and the mixture was heated under reflux for ½ hour and cooled. The polyphenylene ether-polyester copolymer was removed by centrifugation, washed with toluene and again centrifuged. Analysis showed the presence of 10% copolymerized polyphenylene ether.

EXAMPLES 60–69

Solutions of 5 grams each of various polyphenylene ethers and polyesters and, optionally, 5 grams of various polyisocyanates or masked polyisocyanates in 50 ml. of various solvents were heated under nitrogen, with stirring, for 20 hours. The mixtures were then diluted with 50 ml. of toluene, boiled for 30 minutes and cooled. The precipitates were separated by centrifugation, washed with toluene and dried and the proportions of copolymer therein were determined as previously described.

The relevant parameters and copolymer proportions are given in Table VIII. Functionalized polyphenylene ethers and polyesters are identified by example numbers, unfunctionalized polyphenylene ether as "Unfunc." and unfunctionalized polybutylene terephthalate by molecular weight. The isocyanate compounds used were:

(I) Hexamethylene diisocyanate
(II) Azelaoyl bispropylene urea
(III) Tris(6-isocyanatohexyl) isocyanurate.

TABLE VIII

| Example | Polyphenylene ether | Polyester | Isocyanate | Solvent | Temp., °C. | % copolymerized PPE |
|---|---|---|---|---|---|---|
| 60 | Unfunc. | 4,000 | I | 1,2,4-Trichlorobenzene | 180 | 25 |
| 61 | Ex. 3 | 4,000 | I | 1,1,2,2-Tetrachloroethane | 140 | 31 |
| 62 | Ex. 2 | 4,000 | I | 1,2,4-Trichlorobenzene | 180 | 55 |
| 63 | Ex. 3 | 50,000 | I | Nitrobenzene | 170 | 5 |
| 64 | Ex. 2 | 50,000 | II | 1,2,4-Trichlorobenzene | 220 | 20 |
| 65 | Ex. 3 | Ex. 36 | — | 1,1,2,2-Tetrachloroethane | 140 | 38 |
| 66 | Ex. 3 | Ex. 35 | — | Nitrobenzene | 170 | 24 |
| 67 | Ex. 2 | Ex. 35 | — | 1,2,4-Trichlorobenzene | 200 | 58 |
| 68 | Unfunc. | 50,000 | III | 1,2,4-Trichlorobenzene | 200 | 8 |
| 69 | Ex. 3 | 50,000 | III | 1,2,4-Trichlorobenzene | 200 | 17 |

EXAMPLES 70–71

Mixtures of equal weights of various polyphenylene ethers, polyester and tris(6-isocyanatohexyl) isocyanurate were extruded at 270° C. on a twin-screw extruder. The proportions of copolymer in the extrudates were determined as previously described. The results are given in Table IX.

TABLE IX

| Example | Polyphenylene ether | % copolymerized PPE |
|---|---|---|
| 70 | Unfunc. | 18 |
| 71 | Ex. 3 | 23 |

EXAMPLES 72–92

Solutions of 5 grams each of polyester, unfunctionalized or functionalized polyphenylene ether and various coupling agents and condensation catalysts in 50 ml. of dry 1,2,4-trichlorobenzene were heated under nitrogen at 200° C. for two hours, diluted with 50 ml. of toluene and boiled for 30 minutes. The mixtures were cooled and centrifuged and the solids removed by centrifugation were washed with toluene and dried.

The coupling agents and catalysts are identified as follows:

Coupling agents (IV) 1,4-Bis(2-oxazolinyl)benzene
(V) 1,4-Butylene-bis(N-isatoic anhydride)

(VI) Bis(4-isocyanatophenyl)methane
(VII) 1,4-Benzene diisocyanate
(VIII) 2,4-Bis(4-isocyanatophenylmethyl)phenyl isocyanate Catalysts (IX) Zinc acetate
(X) Dibutyltin diacetate
(XI) p-Dimethylaminopyridine
(XII) 1-Phenyl-3-methylphospholene oxide
(XIII) 1,3-Dimethylphospholene oxide
(XIV) Trimethylphosphine oxide
(XV) Triethylphosphine oxide.

The relevant parameters are given in Table X. Proportions of coupling agents and catalysts are in mole percent based on end group concentration of the polyphenylene ether.

TABLE X

| Example | Polyphenylene ether | Coupling agent Identity | Mole % | Catalyst Identity | Mole % | % copolymerized PPE |
|---|---|---|---|---|---|---|
| 72 | Ex. 3 | IV | 1.0 | — | — | 9 |
| 73 | Ex. 3 | IV | 1.0 | IX | 0.1 | 12 |
| 74 | Ex. 3 | IV | 1.0 | X | 0.1 | 20 |
| 75 | Ex. 12 | IV | 1.0 | — | — | 8 |
| 76 | Ex. 12 | IV | 1.0 | IX | 0.1 | 10 |
| 77 | Ex. 12 | IV | 1.0 | X | 0.1 | 29 |
| 78 | Unfunc. | IV | 1.0 | — | — | 6 |
| 79 | Unfunc. | IV | 1.0 | IX | 0.1 | 6 |
| 80 | Unfunc. | IV | 1.0 | X | 0.1 | 11 |
| 81 | Unfunc. | V | 1.0 | XI | 0.5 | 12 |
| 82 | Unfunc. | V | 1.0 | XI | 1.0 | 18 |
| 83 | Unfunc. | V | 1.5 | XI | 1.5 | 18 |
| 84 | Unfunc. | V | 2.0 | XI | 2.0 | 22 |
| 85 | Ex. 3 | VI | 1.0 | XV | 0.1 | 11 |
| 86 | Ex. 3 | VI | 1.0 | XIV | 0.1 | 27 |
| 87 | Ex. 3 | VI | 1.0 | XII | 0.1 | 28 |
| 88 | Ex. 3 | VI | 1.0 | XIII | 0.1 | 29 |
| 89 | Ex. 12 | VI | 1.0 | XV | 0.1 | 24 |
| 90 | Ex. 12 | VI | 1.0 | XII | 0.1 | 35 |
| 91 | Ex. 3 | VII | 2.0 | XIII | 0.1 | 32 |
| 92 | Ex. 3 | VIII | 1.4 | XIII | 0.1 | 29 |

EXAMPLE 93

A mixture of 50 grams each of polyester and the hydroxyalkyl-functionalized polyphenylene ether of Example 17 was heated to 250° C. in a nitrogen-filled Helicone reactor, and 0.2 ml. of tetraisopropyl titanate was added. The mixture was heated and stirred for ½ hour. There was obtained the desired copolymer containing 27% copolymerized polyphenylene ether.

EXAMPLE 94

A solution of one gram each of polyester and the epoxy-functionalized polyphenylene ether of Example 10 in 25 ml. of 1,2,4-trichlorobenzene was heated under reflux for two days and cooled. Unreacted polyphenylene ether was removed as previously described, yielding the desired copolymer composition containing 40% copolymerized polyphenylene ether.

EXAMPLE 95

A solution of 150 grams each of polyphenylene ether and polyester in 2 liters of 1,2,4-trichlorobenzene was distilled until about 100 ml. of distillate had been collected. It was then cooled to 160° C. and there were added dropwise 52 ml. of diphenyl chlorophosphate followed by a mixture of 54 ml. of pyridine and 37.8 ml. of triethylamine. The solution was heated under reflux for 3 hours and cooled, and the solids were precipitated with methanol, filtered, washed with methanol and extracted twice by boiling with 3 liters of toluene, cooling and filtering. The remaining solid was dissolved in 3 liters of boiling chloroform, precipitated with methanol and dried under vacuum to yield the desired copolymer composition. Analysis showed the presence of 18% copolymerized polyphenylene ether.

EXAMPLE 96

A solution of 10 grams each of polyphenylene ether and polyester in 200 ml. of 1,2,4-trichlorobenzene was heated under nitrogen and 1 gram of 1,2-benzisoxazol-3-yl diphenyl phosphate was added, followed by 0.11 ml. of tri-n-butylamine. The solution was heated under reflux for 24 hours, cooled and poured into 2 volumes of acetone. The copolymer composition was filtered, washed with acetone and dried in a vacuum oven. Analysis showed the presence of 12% copolymerized polyphenylene ether.

EXAMPLES 97–99

Solutions of 10 grams each of polyphenylene ether and polyester and 1 gram of a coupling agent in 200 ml. of 1,2,4-trichlorobenzene were heated under reflux for various periods and the copolymer compositions were isolated as in Example 98. The coupling agents used were:
(XVI) 1,1′-terephthaloylbisimidazole
(XVII) 1,1′-isophthaloylbisimidazole
(XVIII) di-3-benzisoxazolyl terephthalate.

The relevant parameters are given in Table XI.

TABLE XI

| Example | Coupling agent | Reaction time, hrs. | % copolymerized PPE |
|---|---|---|---|
| 97 | XVI | 24 | 14 |
| 98 | XVII | 3 | 10 |
| 99 | XVIII | 22 | 12 |

EXAMPLES 100–104

Various functionalized polyphenylene ethers were heated under reflux for 48 hours in a nitrogen atmosphere with an equal weight of polyester in 1,2,4-trichlorobenzene solution. The products were isolated by precipitation into acetone and extraction with toluene as previously described. The results of analysis are given in Table XII.

TABLE XII

| Example | Functionalized PPE of Example | % copolymerized PPE |
|---|---|---|
| 100 | 5 | 17 |
| 101 | 7 | 18 |
| 102 | 8 | 22 |
| 103 | 9 | 17 |
| 104 | 11 | 25 |

As previously mentioned, the polyphenylene ether-poly(alkylene dicarboxylate) copolymer compositions of this invention, and polyphenylene ether-poly(alkylene dicarboxylate) blends in which they are incorporated, have high impact strength, good solvent resistance and other advantageous properties. These properties make them useful for the preparation of molded and extruded articles.

The weight ratio of polyester to polyphenylene ether in the copolymer-containing blend is generally in the range of about 0.5–3.0:1, most often about 0.9–2.5:1. The proportion of copolymerized polyphenylene ether therein is capable of wide variation, essentially any quantity thereof affording some improvement in properties. For the most part, said proportion is in the range of about 10–80% by weight of total resinous components.

The blends may also contain ingredients other than the copolymer, polyphenylene ether and polyester. A particularly useful other ingredient in many instances is at least one elastomeric impact modifier which is compatible with the polyphenylene ether. It is generally present in the amount of about 5–25% by weight of resinous components.

Suitable impact modifiers include various elastomeric copolymers, of which examples are ethylene-propylenediene polymers (EPDM's), both unfunctionalized and functionalized with (for example) sulfonate or phosphonate groups; carboxylated ethylene-propylene rubbers; copolymers (usually block or graft) of alkenylaromatic compounds such as styrene and/or epoxy compounds such as glycidyl methacrylate with polymerizable olefins or dienes, including butadiene, isoprene, chloroprene, ethylene, propylene and butylene; and core-shell elastomers containing, for example, a poly(alkyl acrylate) core attached to a polystyrene shell via an interpenetrating network. Such core-shell elastomers are more fully disclosed in copending, commonly owned application Ser. No. 811,808, filed Dec. 20, 1985, now U.S. Pat. No. 4,681,915.

The preferred impact modifiers are block (typically diblock, triblock or radial teleblock) copolymers of alkenylaromatic compounds and olefins or dienes. Most often, at least one block is derived from styrene and at least one other block from at least one of butadiene, isoprene, ethylene and butylene. Especially preferred are the triblock copolymers with polystyrene end blocks and olefin- or diene-derived midblocks. When one of the blocks is derived from one or more dienes, it is frequently advantageous to reduce the aliphatic unsaturation therein by selective hydrogenation. The weight average molecular weights of the impact modifiers are typically in the range of about 50,000–300,000. Block copolymers of this type are commercially available from Shell Chemical Company under the trademark KRATON, and include KRATON D1101, G1650, G1651, G1652, G1657 and G1702.

Other conventional ingredients which may be present in the copolymer-containing blends include fillers, flame retardants, colorants, stabilizers, antistatic agents, mold release agents and the like, used in conventional amounts. The presence of other resinous components is also contemplated. These include impact modifiers compatible with the polyester, such as various graft and core-shell copolymers of such monomers as butadiene, styrene, butyl acrylate and methyl methacrylate. The presence of such copolymers frequently improves the low-temperature ductility of the blends.

The preparation of copolymer-containing blends is normally achieved under conditions adapted for the formation of an intimate resin blend. Such conditions often include extrusion, typically at temperatures in the range of about 100°–300° C. and otherwise under the conditions previously described. Extrusion may be conveniently effected in a screw-type or similar extruder which applies a substantial shearing force to the composition, thereby decreasing the particle size thereof. It is sometimes found that the impact strength of the composition is increased if it is extruded more than once, thereby insuring effective blending.

The preparation and properties of blends containing the copolymers of this invention in combination with impact modifiers are illustrated by the following examples.

EXAMPLES 105–111

Resin blends were prepared by extrusion under conventional conditions in a twin-screw extruder. The impact modifier ("SEBS") in each blend was a commercially available triblock copolymer in which the polystyrene end blocks have weight average molecular weights of 29,000 and the ethylene/butylene midblock has a weight average molecular weight of 116,000.

The relevant proportions and parameters are given in Table XIII. All ingredient percentages are by weight. Polyesters are identified as "PET" (polyethylene terephthalate) or "PBT" (polybutylene terephthalate) and by number average molecular weight. Tensile strength and modulus values are in pascals $\times 10^{-7}$.

TABLE XIII

| Example | 105 | 106 | 107 | 108 | 109 | 110 | 111 |
|---|---|---|---|---|---|---|---|
| Copolymer-containing composition, %: | | | | | | | |
| Example 41 | 75.4 | — | — | — | — | — | — |
| Example 43 | — | — | — | — | 64.4 | — | — |
| Polyphenylene ether, %: | | | | | | | |
| Unfunc. | 0.5 | — | — | — | 12.75 | — | — |
| Example 4 | — | — | — | — | — | 45 | 45 |
| Example 5 | — | 36 | — | — | — | — | — |
| Example 6 | — | — | 36 | 36 | — | — | — |
| Polyester, %: | | | | | | | |
| PBT, 40,000 | 14.1 | 54 | 55 | — | 12.75 | 45 | — |
| PET, 45,000 | — | — | — | 55 | — | — | 45 |

TABLE XIII-continued

| Example | 105 | 106 | 107 | 108 | 109 | 110 | 111 |
|---|---|---|---|---|---|---|---|
| Impact modifier: SEBS, % | 10 | 10 | 9 | 9 | 10.1 | 10 | 10 |
| Izod impact strength (notched), joules/m. | 753 | 134 | 219 | 64 | 630 | 625 | 673 |
| Tensile strength at yield | 4.39 | 4.75 | 4.90 | 5.31 | 4.78 | 4.39 | — |
| Tensile strength at break | 4.09 | 4.16 | 4.34 | 4.83 | 4.57 | 4.41 | — |
| Elongation at break, % | 130 | 70 | 38 | 75 | 77 | 81 | — |
| Tensile modulus | 77.2 | — | — | 80.0 | 56.2 | 37.6 | — |
| Heat distortion temp., °C. | 161 | 167 | — | — | — | — | — |

What is claimed is:

1. A composition comprising copolymers having polyphenylene ether moieties comprising a plurality of structural units having the formula

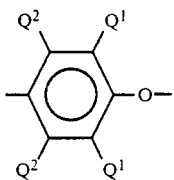
(II)

wherein in each of said units independently, each $Q^1$ is independently halogen, primary or secondary lower alkyl, phenyl, haloalkyl, aminoalkyl, hydrocarbonoxy, or halohydrocarbonoxy wherein at least two carbon atoms separate the halogen and oxygen atoms; and each $Q^2$ is independently hydrogen, halogen, primary, or secondary lower alkyl, phenyl, haloalkyl, hydrocarbonoxy or halohydrocarbonoxy as defined for $Q^1$; connected to poly(alkylene dicarboxylate) moieties containing at least 30 alkylene dicarboxylate units by polyvalent linking groups containing one or more carboxamide groups.

2. A composition according to claim 1 wherein the poly(alkylene dicarboxylate) moieties comprise at least 50 structural units of the formula

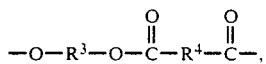
(VII)

wherein $R^3$ is a divalent aliphatic or alicyclic radical containing about 2-10 carbon atoms and $R^4$ is a divalent aliphatic, alicyclic or aromatic radical containing about 2-10 carbon atoms.

3. A composition according to claim 2 wherein the linking groups have a formula weight up to about 1500.

4. A composition according to claim 3 wherein the polyphenylene ether is a poly(2,6-dimethyl-1,4-phenylene ether).

5. A composition according to claim 4 wherein the polyester is a poly(ethylene terephthalate) or a poly(1,4-butylene terephthalate).

6. A composition according to claim 5 wherein the polyester is a poly(1,4-butylene terephthalate).

7. A composition comprising copolymers having the formula $$A-Z^1-B \qquad (I)$$

wherein A is derived from a polyphenylene ether comprising a plurality of structural units having the formula

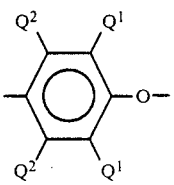
(II)

and in each of said units independently, each $Q^1$ is independently halogen, primary or secondary lower alkyl, phenyl, haloalkyl, aminoalkyl, hydrocarbonoxy, or halohydrocarbonoxy wherein at least two carbon atoms separate the halogen and oxygen atoms; and each $Q^2$ is independently hydrogen, halogen, primary or secondary lower alkyl, phenyl, haloalkyl, hydrocarbonoxy or halohydrocarbonoxy as defined for $Q^1$; B is a poly(alkylene dicarboxylate) moiety and $Z^1$ is a divalent linking group containing one or more carboxamide groups.

8. A resinous composition comprising a poly(alkylene dicarboxylate); an epoxy-functionalized polyphenylene ether prepared by reacting a polyphenylene ether with at least one of glycidyl methacrylate, glycidyl acrylate, glycidyl ethyl maleate, glycidyl ethyl fumarate and allyl glycidyl ether; and any reaction products thereof.

9. A composition according to claim 8 wherein the polyphenylene ether comprises a plurality of structural units having the formula

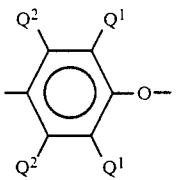
(II)

and in each of said units independently, each $Q^1$ is independently halogen, primary or secondary lower alkyl, phenyl, haloalkyl, aminoalkyl, hydrocarbonoxy, or halohydrocarbonoxy wherein at least two carbon atoms separate the halogen and oxygen atoms; and each $Q^2$ is independently hydrogen, halogen, primary or secondary lower alkyl, phenyl, haloalkyl, hydrocarbonoxy or halohydrocarbonoxy as defined for $Q^1$.

10. A composition according to claim 9 wherein the polyphenylene ether is a poly(2,6-dimethyl-1,4-phenylene ether).

11. A resinous composition comprising a poly(alkylene dicarboxylate); an epoxy-functionalized polyphenylene ether prepared by reacting a polyphenylene ether with terephthaloyl chloride and subsequently with glycidol; and any reaction products thereof.

12. A composition according to claim 11 wherein the polyphenylene ether comprises a plurality of structural units having the formula

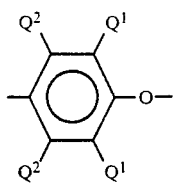
(II)

and in each of said units independently, each $Q^1$ is independently halogen, primary or secondary lower alkyl, phenyl, haloalkyl, aminoalkyl, hydrocarbonoxy, or halohydrocarbonoxy wherein at least two carbon atoms separate the halogen and oxygen atoms; and each $Q^2$ is independently hydrogen, halogen, primary or secondary lower alkyl, phenyl, haloalkyl, hydrocarbonoxy or halohydrocarbonoxy as defined for $Q^1$.

13. A composition according to claim 12 wherein the polyphenylene ether is a poly(2,6-dimethyl-1,4-phenylene ether).

* * * * *

UNITED STATES PATENT AND TRADEMARK OFFICE
CERTIFICATE OF CORRECTION

PATENT NO. : 5,015,698

DATED : May 14, 1991

INVENTOR(S) : Paul D. Sybert et al.

It is certified that error appears in the above-identified patent and that said Letters Patent is hereby corrected as shown below:

Title page, the name of John A. Tyrell as a joint inventor should be removed.

Signed and Sealed this

Eighth Day of December, 1992

Attest:

DOUGLAS B. COMER

Attesting Officer

Acting Commissioner of Patents and Trademarks